US007908588B2

(12) United States Patent
Charboneau et al.

(10) Patent No.: US 7,908,588 B2
(45) Date of Patent: Mar. 15, 2011

(54) PROGRAM PRESENTATION WITH REVIEWER FEEDBACK MAINTENANCE

(75) Inventors: David Paul Charboneau, Durham, NC (US); Gary Martin Johnston, Chapel Hill, NC (US); Hirotaka Matsumoto, Kanagawa (JP); Takashi Sakairi, Yamato (JP); Kotaro Shima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 11/611,906

(22) Filed: Dec. 18, 2006

(65) Prior Publication Data
US 2008/0148163 A1 Jun. 19, 2008

(51) Int. Cl.
*G06F 9/44* (2006.01)
(52) U.S. Cl. ...................................................... 717/120
(58) Field of Classification Search .................. 717/106, 717/124, 120
See application file for complete search history.

(56) References Cited

U.S. PATENT DOCUMENTS

| 7,657,542 | B2 * | 2/2010 | Sundararajan et al. | 717/104 |
| 2003/0212956 | A1 * | 11/2003 | Uehara et al. | 715/513 |
| 2005/0071769 | A1 * | 3/2005 | Suzuki et al. | 715/762 |
| 2005/0108686 | A1 * | 5/2005 | White | 717/124 |
| 2006/0059011 | A1 * | 3/2006 | Ulreich et al. | 705/1 |
| 2006/0156272 | A1 * | 7/2006 | Goncharenko et al. | 717/100 |
| 2007/0239470 | A1 * | 10/2007 | Ronen et al. | 705/1 |
| 2008/0019281 | A1 * | 1/2008 | Liger et al. | 370/252 |
| 2008/0086742 | A1 * | 4/2008 | Aldrey et al. | 725/24 |

FOREIGN PATENT DOCUMENTS

| CN | 1517859 A | 8/2004 |
| JP | 8016514 A | 1/1996 |

* cited by examiner

*Primary Examiner* — Wei Y Zhen
*Assistant Examiner* — Chih-Ching Chow
(74) *Attorney, Agent, or Firm* — Fred Grasso

(57) ABSTRACT

An application with a function for inputting feedback incorporated into it is created and presented with the present embodiment. By this means, feedback about the problems in the running of the application may be obtained efficiently. In addition, an application with a function for inputting feedback about the components that define the operations of the application and a function that maintains a correspondence between the feedback descriptions and the components that are the target of the feedback incorporated into it is created by the present embodiment. By this means, the component in the application that the feedback concerns may easily be determined.

18 Claims, 22 Drawing Sheets

```
<children_xsi:type"com.ibm.sid.sketcher.model:Hyperlink"
  xmi: id"_-d3YwE8IEduQTuPijc8Mig" id"Hyperlink 1" label"Login">
  <sketchStyle underline="true"/>
  <layoutConstraint xsi:type"com.ibm.sid.sketcher.model:ERectangle"
    x"212" y="247" width="29" height"14"/>
</children>
```

FIG. 20a

```
<A id="_-d3YwE8IEduQTuPijc8Mig"
class="#hyperlink"
href="javascript:parent.doAction("_-d3YwE8 I EduQTuPijc8Mig')"
style="
position: absolute;
width: 29;
height: 14;
left: 212;
top: 247;
text-decoration: none">
<SPAN id="Hyperlink1_span"
class="centerMe"
style="
position: absolute; left: 0px; top: 0px;
text-align: center;
cursor: pointer;
font-family: 'Tahoma';
font-size: 9pt;
font-style: normal;
font-weight: normal;
text-decoration: underline;
color: rgb(0,0,0);
white-space: nowrap;
">
Login
</SPAN>
</A>
```

FIG. 20b

```
<com.ibm.sid.requirement.model.internal.annotationmodel:AnnotationContainer xmi:version='2.0'
   xmlns:xmi='http://www.omg.org/XMI'
   xmlns:com.ibm.sid.requirement.model.internal.annotationmodel='http:///com/ibm/sid/requirement/model/
internal/annotationmodel.ecore' title="Feedbacks">
  <annotations refModel File="feedback/login.sketch' submitter="unknown'
     refObjectLocation='x:231; y:258: to -43YwE8IEduQTuPijc8Mig">
    <result/>
    <styledRemark text='This needs to be a button' />
  </annotations>
</com.ibm.sid.requirement.model.internal.annotationmodel:AnnotationContainer>
```

FIG. 21

PROGRAM PRESENTATION WITH REVIEWER FEEDBACK MAINTENANCE

FIELD OF THE INVENTION

The present invention relates to a device, method, and program for developing application programs (hereinafter referred to as simply "applications"), and more specifically to a device, method, and program that makes reviewing of applications possible.

BACKGROUND OF THE INVENTION

Typically, the problems in the operation of applications are noticed by users when attempts are made to run the application. In such cases, the user notifies the developer of the application about the problem. Such operations are normally carried out with the following steps.
1. The developer sends the application to the user.
2. The user runs the application and describes the problem. At that time, screen captures may be taken to clarify the problem.
3. The user sends these to the developer.
4. The developer reads the description of the problem. At that time, the screen captures may be referred to for gaining an understanding of the problem.
5. The developer opens an application development tool and solves the problem.

However, with the scenario in question, the developer must find the location of the problem in the application based on the description obtained from the user. If there are screen captures, it may help in that investigation. However, when there are no screen captures, there is the fear of the developer not being able to find the correct location where the problem is. Moreover, when a group of people are working on drawing objects, technology already exists such that any user can input comment data for the drawing object (for example, see Published Unexamined Patent Application JP8-16514). In this Patent Reference, comments concerning drawing, text and other objects that are displayed in a screen area that is shared with others through a communications network are stored together with the object, and the object and the comments are used jointly through the communications network.

BRIEF DESCRIPTION OF THE DRAWINGS

FIG. 20 is a drawing showing an example of the source code used during design and during creation of the application in the present embodiment.
FIG. 21 is a drawing showing an example of the source code in a file where the feedback has been output in the present embodiment.

DESCRIPTION OF THE PREFERRED EMBODIMENT

Figure 1:
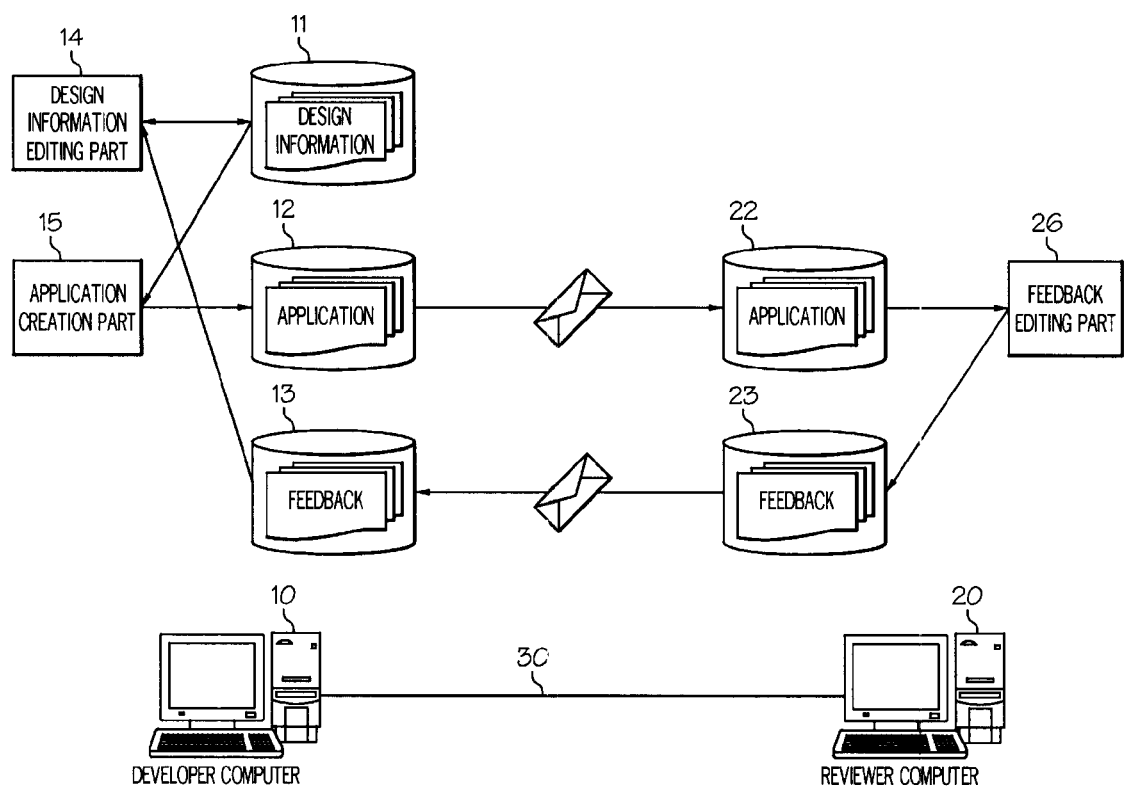
FIG. 1 is a drawing showing a constitution for the computer system in the present embodiment.

However, the above cited patent merely discloses the sharing of comment data related to a drawing object among a plurality of users working in collaboration with each other. Namely, no means is disclosed for efficiently communicating information concerning the operation of the application from a user to the developer when one user is the application developer and refers to the screen for defining the operations of the application (an application development tool or environment) and another user is a user of the application and refers to the screen to run the application.

The present invention is for solving technical problems such as those above, and it is an object thereof to be able to efficiently acquire information concerning the operation of an application. Furthermore, another object of the present invention is acquiring the information concerning the operation of an application in such a way that it can be determined which location within the application the acquired information is concerned with.

Based on these objects, an application was developed where, in the development of an application, it is possible to relate the data that is input concerning elements that define the operation of the application to those elements. Namely, the device of the present invention is provided with a display part that displays a plurality of elements that define the operations of an application and a creation part that creates an application program that carries out operations defined by a plurality of elements displayed on this display part and maintains the correspondence between the specific element and the data when data related to a specific element out of the plurality of elements is entered.

Here, the creation part may be such that an application program that outputs the correspondence information as a file is created. In addition, there may also be provided a reading part that reads the correspondence information that the application program maintains, and the display part may further display data that includes the correspondence information read by the reading part. Furthermore, the display part can be constituted so as to display the correspondence relationship between the specific element and the data in response to a predetermined operation. In addition, a user interface object for inputting and outputting information among users is given as an example for a specific element. Alternatively, it may be a transition between two user interface objects for inputting and outputting information among users.

In addition, the present invention may also be perceived as a method for developing application programs. In such cases, the method of the present invention includes a step that displays the plurality of elements defining the operations of the application program, a step that carries out the operations defined by the plurality of elements and creates the application program for maintaining the correspondence information for the specific element and the data when the data for a specific element out of the plurality of elements is entered, a step where the application program reads the correspondence information, and a step that displays the data included in the correspondence information.

On the other hand, the present invention may also be perceived as a program for implementing prescribed functions on a computer. In such cases, a first program of the present invention implements a function that reads design information obtained by designing using a plurality of elements that operate the application program and a function carries out the operations defined by the plurality of elements and creates the application program that maintains the correspondence information for the specific element and the data when data is input for a specific element out of the plurality of elements. In addition, a second program of the present invention is a computer program reviewed by a reviewer. Furthermore, the functions provided for the reviewer so as to input into the computer the data concerning the specific element out of the plurality of elements that define the operations of that computer program and the function for maintaining the correspondence information between the specific element and the data when data is input by the reviewer are implemented. Furthermore, a third program of the present invention implements the function for displaying the plurality of elements that define the operations of the application program, the function for reading the correspondence information for the specific element created by the data concerning the specific element out of the plurality of elements being input and the data, and the function for displaying the data included in the correspondence information.

According to the present invention, it becomes possible to efficiently acquire information concerning the operation of an application.

In the following, the preferred embodiment for carrying out the present invention (hereinafter, referred to as "embodiment") will be described in detail referring to the appended drawings. First, the computer system used by the present embodiment will be described. FIG. 1 is a drawing showing an example of the elements of the computer system in the present embodiment. As is shown in the drawing, the computer system comprises a computer 10 and a computer 20 connected via a communications line 30.

Here, the computer 10 is a computer used by the application developer. Furthermore, an application development tool, which is software for developing applications, is installed. For example, a personal computer, a workstation or another computer may be used for this computer 10. In addition, the computer 20 is a computer used by the application reviewer. Here, the reviewer is someone who is a user of the application, reviews the operation of the application, and verifies whether or not that operation satisfies the requirements. For example, a personal computer, a workstation or another computer may also be used for this computer 20. Furthermore, the communications line 30 maybe anything as long as it carries out telecommunications between the computer 10 and the computer 20, and for example, the Internet may be used.

Next, the functions of the computer 10 and the computer 20 are provided with in the present embodiment will be described. First, the functions on the computer 10 used by the developer will be described. This computer 10 is equipped with a design information storage part 11, an application storage part 12, and a feedback storage part 13. In addition, a design information editing part 14 and an application creation part 15 are provided.

Here, the computer 10 is a computer used by the application developer. Furthermore, an application development tool, which is software for developing applications, is installed. For example, a personal computer, a workstation or another computer may be used for this computer 10. In addition, the computer 20 is a computer used by the application reviewer. Here, the reviewer is someone who is a user of the application, reviews the operation of the application, and verifies whether or not that operation satisfies the requirements. For example, a personal computer, a workstation or another computer may also be used for this computer 20. Furthermore, the communications line 30 may be anything as long as it carries out telecommunications between the computer 10 and the computer 20, and for example, the Internet may be used.

Next, the functions of the computer 10 and the computer 20 as provided within the present embodiment will be described. First, the functions on the computer 10 used by the developer will be described. This computer 10 is equipped with a design information storage part 11, an application storage part 12, and a feedback storage part 13. In addition, a design information editing part 14 and an application creation part 15 are provided.

The design information storage part 11 stores the design information created by the user's defining the operations of the application. Namely, the design information is information that includes a component for an example of the elements that define the operations of the application. Here there are, for example, user interface (UI) objects and UI transitions for the components that define the operation of the application. A UI object is an object that the user can confirm visually, and is a page or a button, text box, checkbox, table or other UI element displayed on a display. In addition, UI objects may have a hierarchical structure, and this is applicable to tables and cells, which are their subordinate objects. UI transitions are defined as moving and changing to another UI by an operation in a certain UI. However, although this example is of a component related to a UI, the concept is not limited to this. For example, making a component out of a process (for example, database search processing or the like) that is not directly related to the UI that is executed by the operation in a certain UI may also be considered to be using this concept.

Moreover, these functions are executed through cooperation between the software and hardware resources. Specifically, the design information editing part 14 and the application creation part 15 are achieved by the CPU of the computer 10 executing the application development tool by reading from, for example, a magnetic disk device into a main memory. In addition, the design information storage part 11, application storage part 12, and feedback storage part 13 may be achieved using, for example, a magnetic disk device. Furthermore, the programs and data stored on the magnetic disk device may also be loaded from a CD or other storage medium or may be downloaded through a network such as the Internet.

Next, the functions on the computer 20 used by the reviewer will be described. This computer 20 is equipped with an application storage part 22 and a feedback storage part 23. In addition, it is equipped with a feedback editing part 26. The application storage part 22 stores an application created in the computer 10 and received through the communications line 30. The feedback storage part 23 stores feedback that has been output by the application. The feedback editing part 26 inputs the feedback for the application and indicates the saving of the feedback.

Moreover, these functions are executed through cooperation between the software and hardware resources. Specifically, the feedback editing part 26 is achieved by the CPU of the computer 20 reading the application that has been created in the computer 10 from the application storage part 22 to the main memory and executing it. In addition, the application storage part 22 and feedback storage part 23 may be achieved using, for example, a magnetic disk device. Furthermore, the programs and data stored on the magnetic disk device may also be loaded from a CD or other storage medium or may be downloaded through a network such as the Internet.

Figure 2:
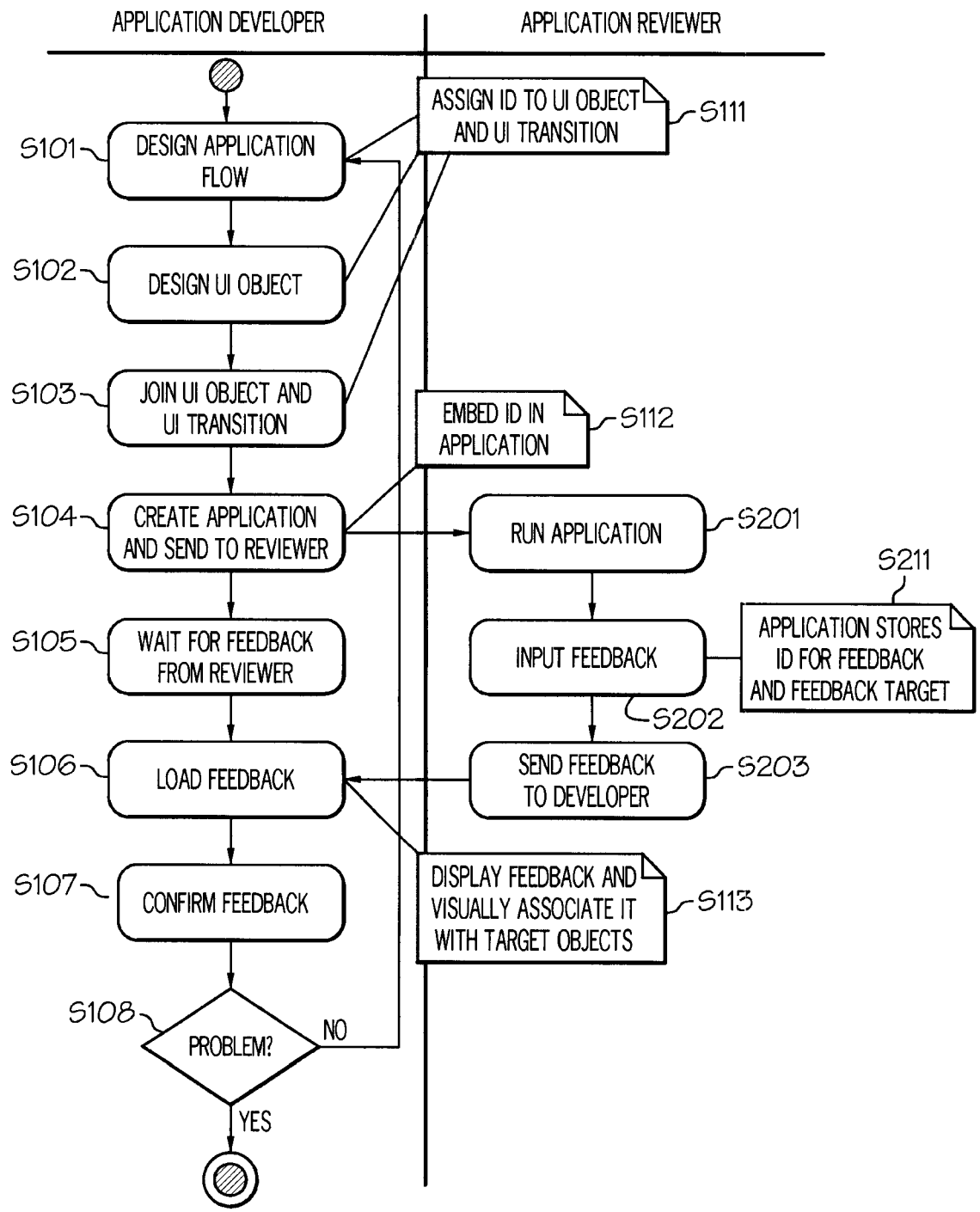
FIG. 2 is a flow chart showing the flow of operations in the present embodiment.

Next, we describe the flow of work when the developer creates an application, the reviewer reviews that application, and the developer confirms the results of the review on the computer system in question. FIG. 2 is a flow chart showing this workflow. Moreover, something UI related such as a UI object or a UI transition is presumed here for the component that defines the operations of the application. In the figure, the workflow for the developer is shown on the left side, and the workflow for the reviewer is shown on the right side. In addition, the operations of the application development tool are shown on the boundary line in the middle of the figure.

First, the developer designs the application flow (Step 101). Here, the application flow is the definition of the processing flow for the application. Next, the developer designs a UI object used in the application processing (Step 102). In addition, a UI transition is associated with the UI object if necessary (Step 103). At this time, the application development tool assigns a unique ID to the UI object and the UI transition (Step 111).

Next, the developer creates an application using the application development tool and sends that application to the reviewer (Step 104). At this time, the application development tool embeds the ID assigned in step 111 in the application (Step 112). Furthermore, the developer waits for the reviewer to return feedback (Step 105).

On the other hand, the reviewer, who has received the application, first runs the application (Step 201). In addition, the reviewer may view the UI transition at this time. Furthermore, the reviewer adds feedback about the UI object, UI transition and the like according to the results of the running of the application (Step 202). At this time, in addition to the feedback itself, the application also records the position information on the screen of the component that is the object of the feedback as well as its ID (Step 211). Moreover, in FIG. 2, not only the component ID, but also the position information is recorded, but this is to communicate the strict position of the target of the feedback which cannot be communicated by the component ID alone. By this means for example, circumstances such as not understanding the meaning of the target location of a character string within a cell even when the cell ID is recorded for a data table may be dealt with. However, an embodiment that does not record the position information when the ID of the component alone is sufficient for identifying the target of the feedback may be used. Finally, the reviewer sends the feedback to the developer (Step 203).

By this means, the developer receives the feedback, and the application development tool loads the feedback (Step 106). At this time, the application development tool relates the feedback to the position where the reviewer has added the feedback based on the position information and the ID of the component that is the target of the feedback (Step 113). Subsequently, the developer reads and analyzes the feedback in the application development tool (Step 107). Furthermore, the developer determines whether or not there is a problem (Step 108), and if there is a problem, returns to step 101, and if not, ends the operation.

Figure 3:
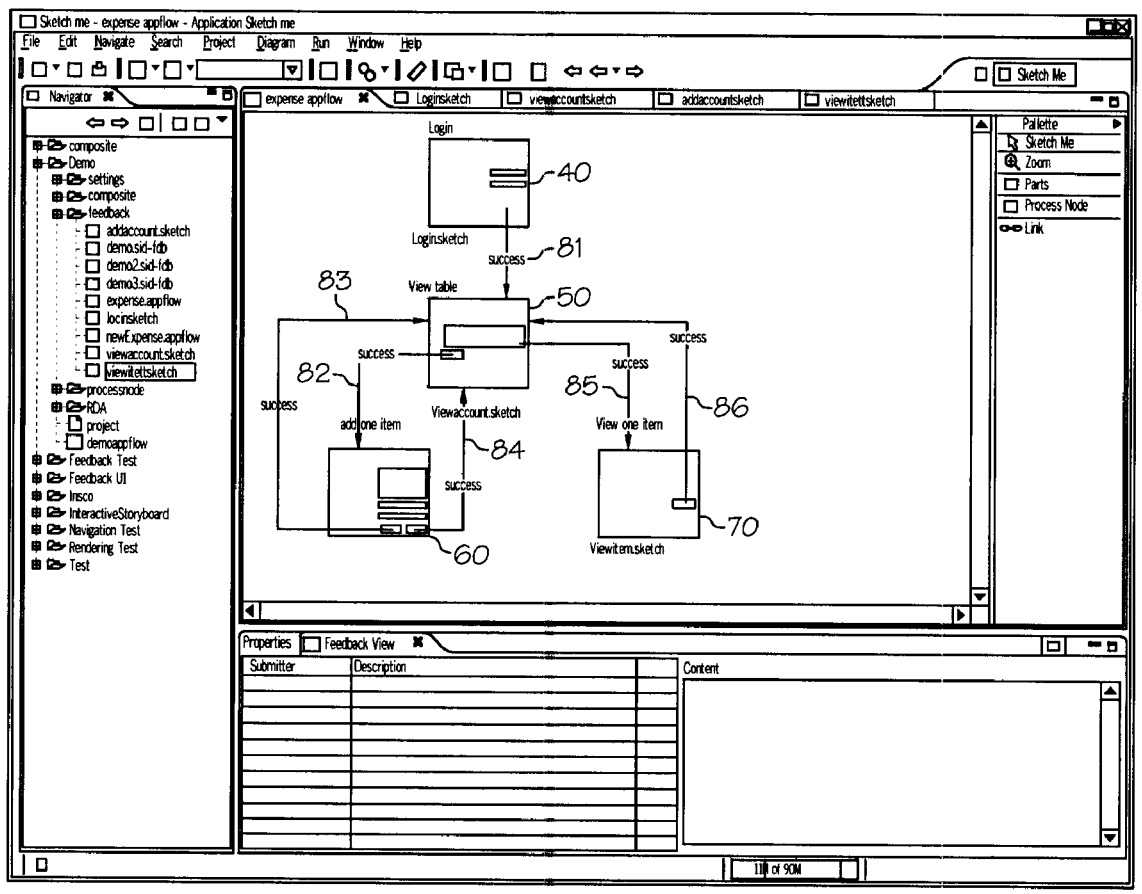
FIG. 3 is a drawing showing an example of a screen that is displayed during the application design in the present embodiment.

In the following, we show examples of the screens displayed following this workflow. First, a description of examples of screens displayed on the computer 10 when the developer is designing the application will be given referring to FIG. 3-FIG. 7. FIG. 3 shows an example of the screen when the application flow is designed. In this example, this is called "page flow," because the application flow is shown by transitions between pages here. This page flow shows that the application is designed to include a login page 40, a table display page 50, an item addition page 60, and an item display page 70. In addition, a UI transition 81 which represents the transition to the table display page 50 when the login page 40 is operated and a UI transition 82 which represents the transition to the item addition page 60 when the table display page 50 is operated are shown in the page flow. Furthermore, UI transitions 83 and 84 which represent a return to the table display page 50 when the item edition page 60 is operated, a UI transition 85 which represents a transition to the item display page 70 when the table display page 50 is operated, and a UI transition 86 which represents a return to the table display page 51 and the item display page 70 is operated are also shown.

Figure 4:
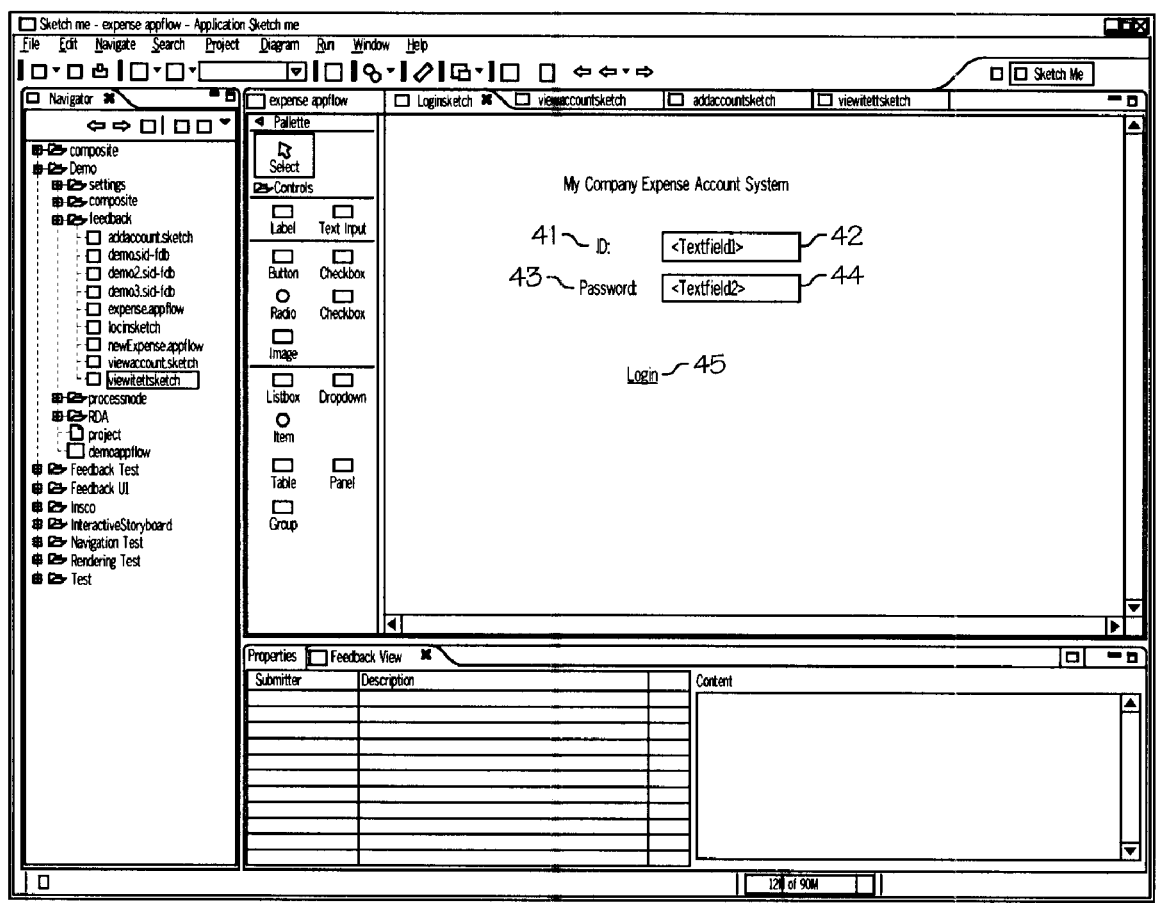
FIG. 4 is a drawing showing an example of a screen that is displayed during the application design in the present embodiment.
Figure 5:
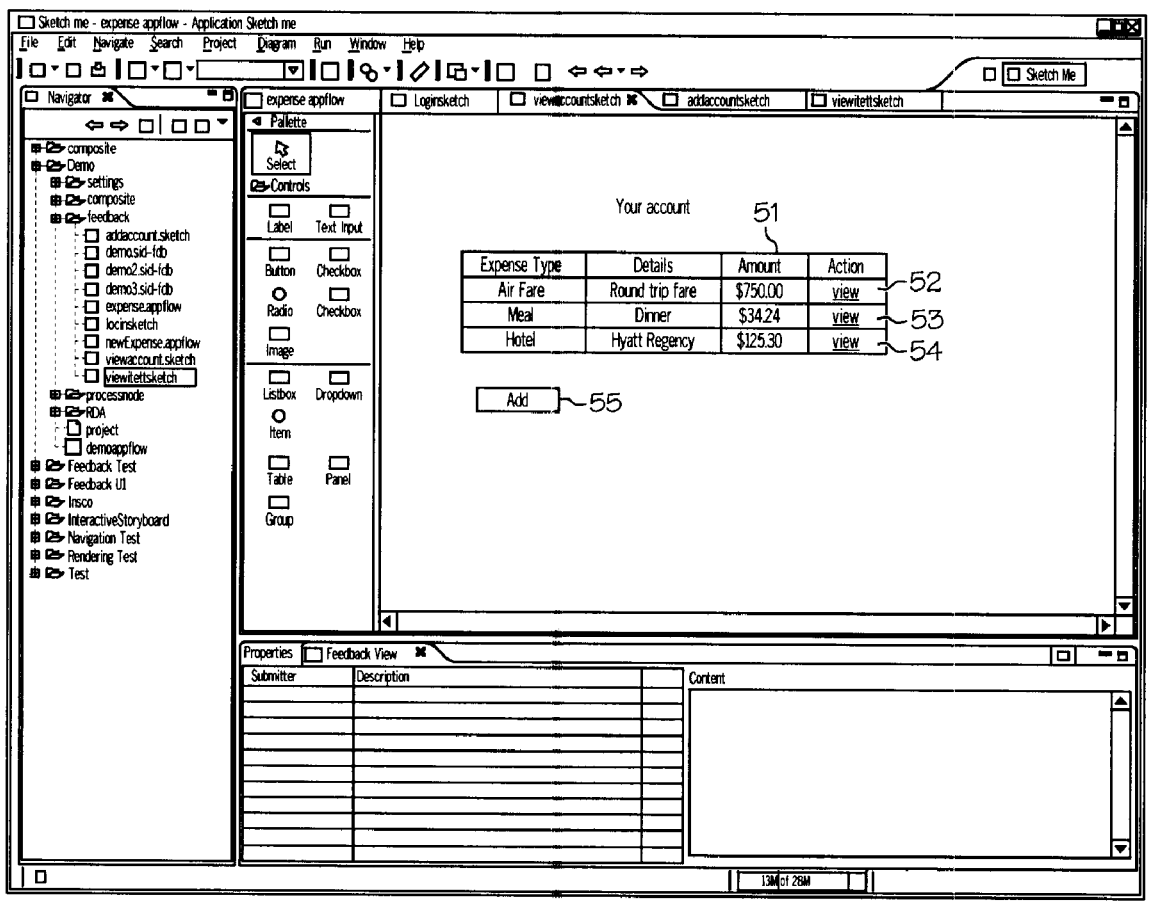
FIG. 5 is a drawing showing an example of a screen that is displayed during the application design in the present embodiment.

FIG. 4 shows an example of the screen when the login page 40 is designed. A label 43 and a text box 44 for the system user password are placed along with a label 41 and a text box 42 for the system user ID being placed on the login page 40. In addition, a link 45 that is pressed after the ID and password are input is also placed on the login page 40.

In the following, we show examples of the screens displayed following this workflow. First, a description of examples of screens displayed on the computer 10 when the developer is designing the application will be given referring to FIG. 3-FIG. 7. FIG. 3 shows an example of the screen when the application flow is designed. In this example, this is called "page flow," because the application flow is shown by transitions between pages here. This page flow shows that the application is designed to include a login page 40, a table display page 50, an item addition page 60, and an item display page 70. In addition, a UI transition 81 which represents the transition to the table display page 50 when the login page 40 is operated and a UI transition 82 which represents the transition to the item addition page 60 when the table display page 50 is operated are shown in the page flow. Furthermore, UI transitions 83 and 81 which represent a return to the table display page 50 when the item addition page 60 is operated, a UI transition 85 which represents a transition to the item display page 70 when the table display page 50 is operated, and a UI transition 86 which represents a return to the table display page 51 and the item display page 70 is operated are also shown.

Figure 6:
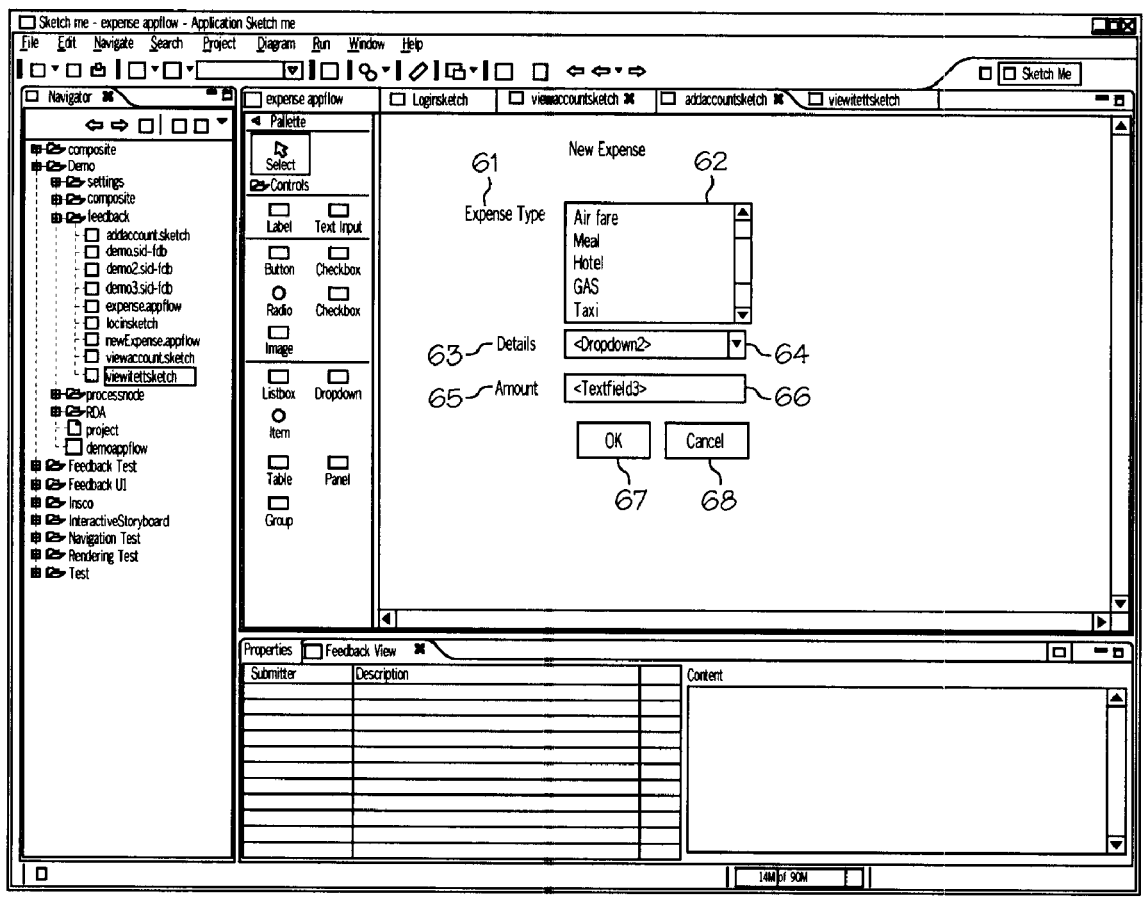
FIG. 6 is a drawing showing an example of a screen that is displayed during the application design in the present embodiment.

FIG. 6 shows an example of the screen when the item addition page 60 is designed. A label 61 and a list box 62 are placed on the item addition page 60 for the expense type section, and there are placed a label 65 and a text box 66 for the amount along with there being placed a label 63 and a combo box 64 for the details. In addition, there are placed an OK button 67 that is pressed when confirming these inputs and a Cancel button 68 that is pressed when canceling these inputs.

Figure 7:
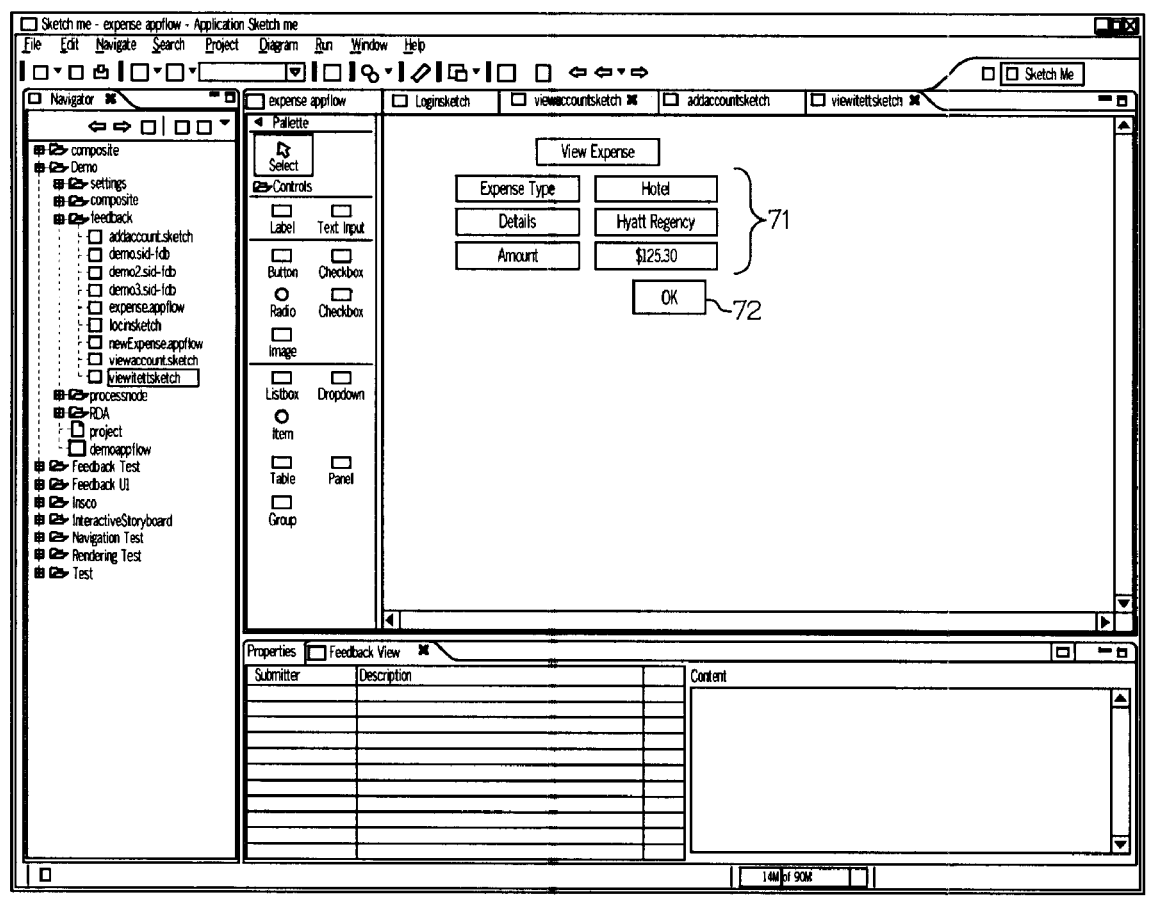
FIG. 7 is a drawing showing an example of a screen that is displayed during the application design in the present embodiment.

FIG. 7 shows an example of the screen when the item display page 70 is designed. A display 71 for the expense type section, details and amount and a button 72 that is pressed after confirming this display 71 are placed on the item display page 70.

FIG. 6 shows an example of the screen when the item addition page 60 is designed. A label 61 and a list box 62 are placed on the item addition page 60 for the expense type section, and there are placed a label 65 and a text box 66 for the amount along with there being placed a label 63 and a combo box 64 for the details. In addition, there is placed an OK button 67 that is pressed when confirming these inputs and a Cancel button 68 that is pressed when canceling these inputs.

Figure 8:
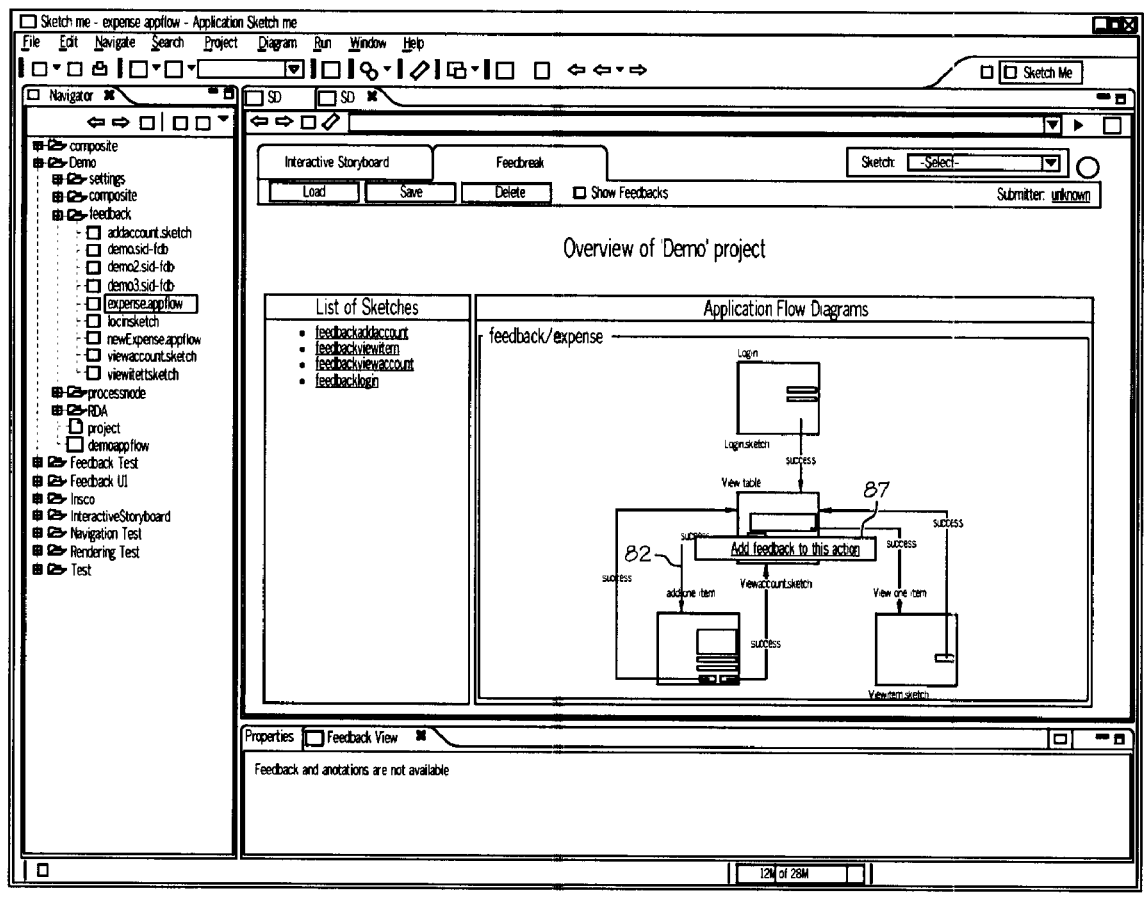
FIG. 8 is a drawing showing an example of a screen that is displayed during the application review in the present embodiment.
Figure 9:
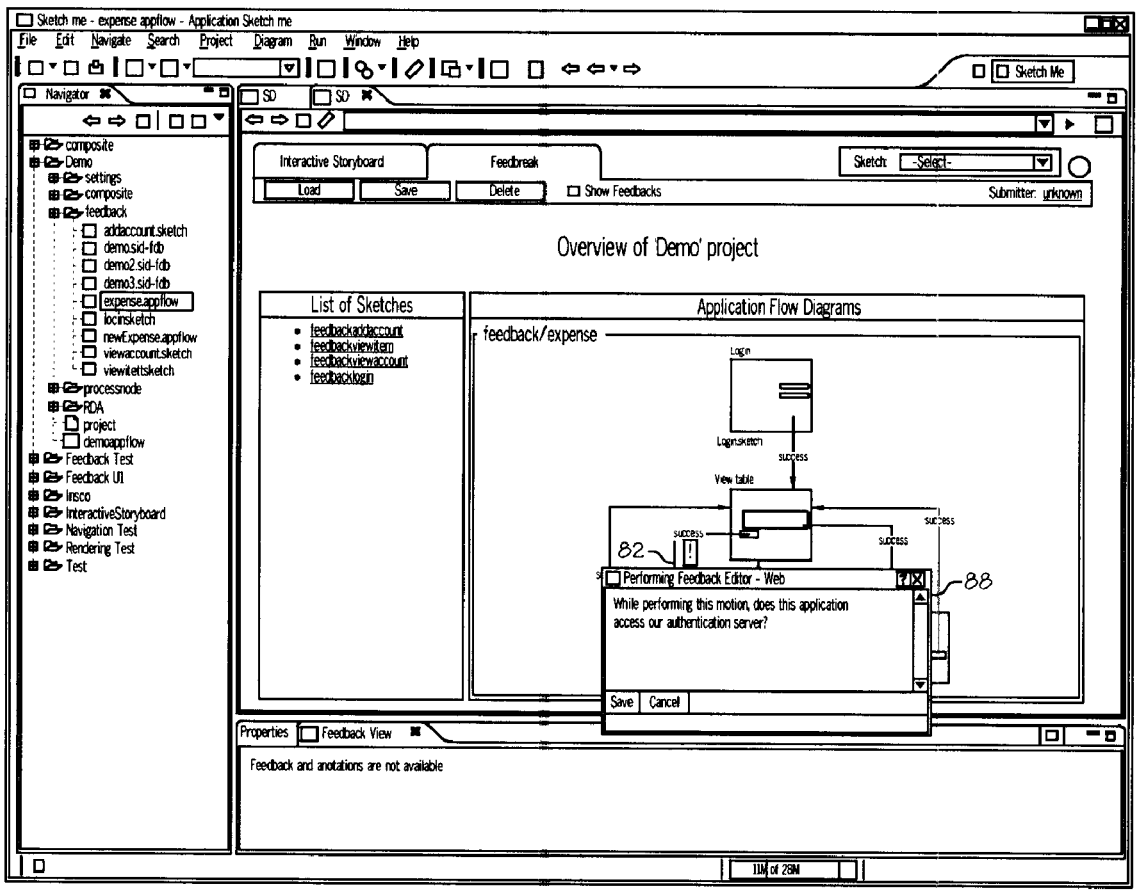
FIG. 9 is a drawing showing an example of a screen that is displayed during the application review in the present embodiment.

FIG. 8 shows the situation when the mouse is clicked on the UI transition 82 in the page flow. In this case, a menu 87, "Add feedback to this action," is displayed. In this state, if, for example, the menu 87 is clicked, it goes to the state shown in FIG. 9. In other words, a dialog box 88 for inputting feedback is displayed. Furthermore, in FIG. 9, the feedback "While performing this action, does this application access our authentication server?" is input in this dialog box 88 by the reviewer.

Figure 10:
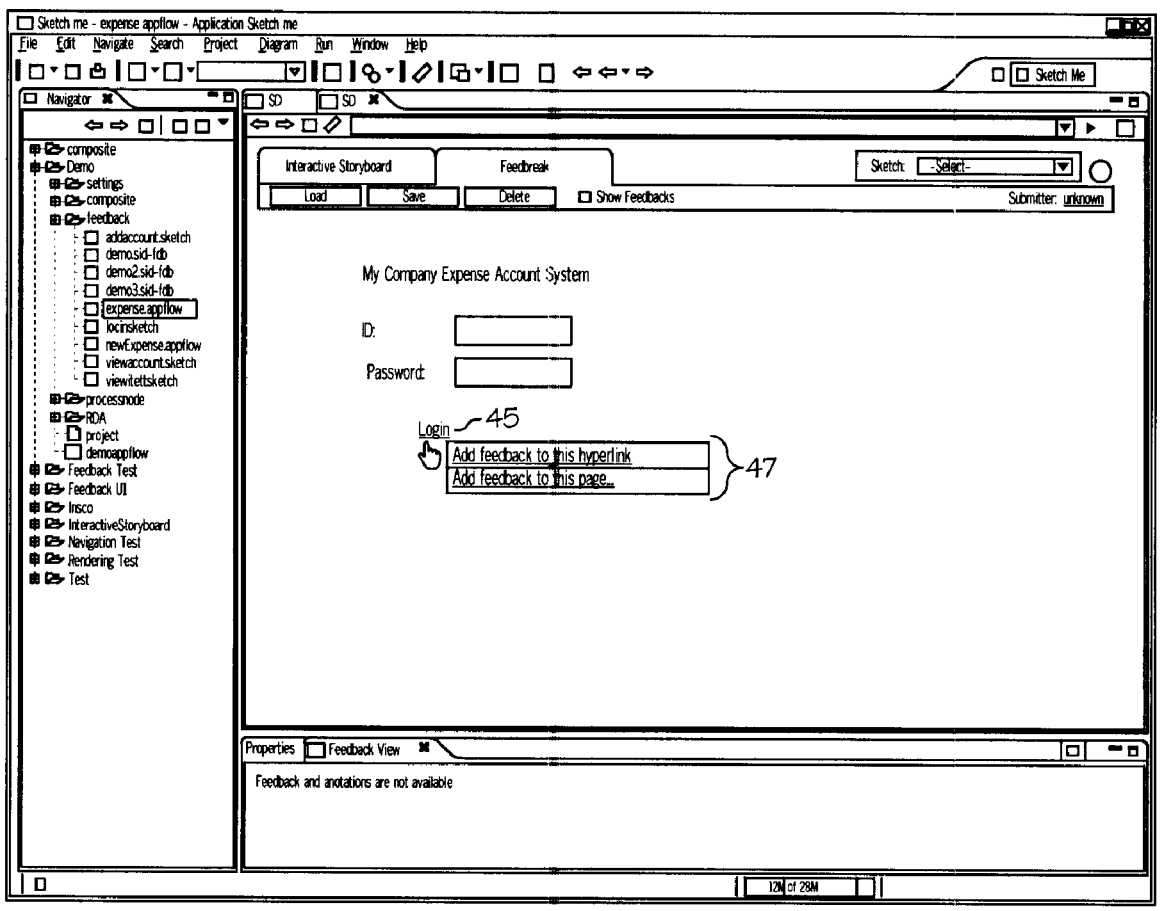
FIG. 10 is a drawing showing an example of a screen that is displayed during the application review in the present embodiment.
Figure 11:
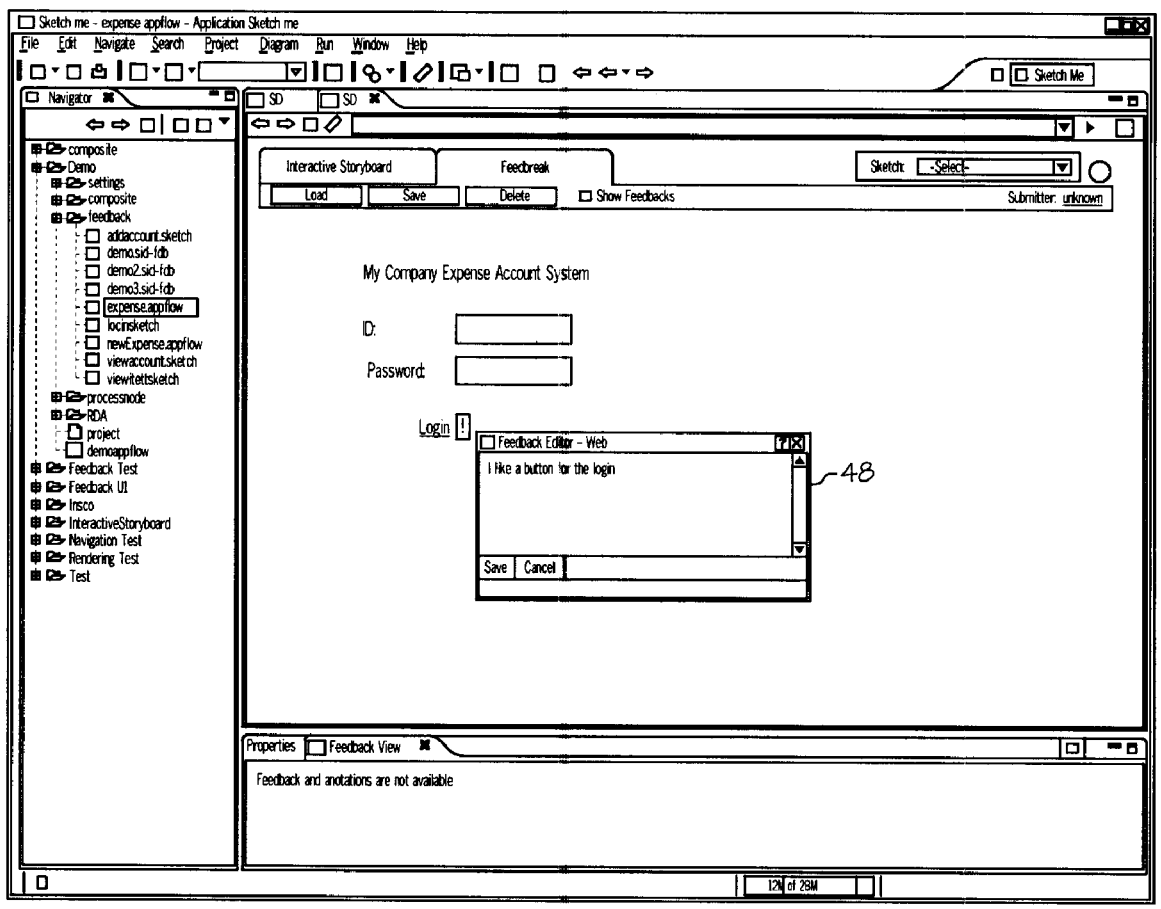
FIG. 11 is a drawing showing an example of a screen that is displayed during the application review in the present embodiment.

FIG. 10 shows the situation when the mouse is clicked on the link 45 on the login page 40. In this case, a menu 47 with "Add feedback to this hyperlink" and "Add feedback to this page" is displayed. In this state, if, for example, the first line on the menu 47 is clicked, it goes to the state shown in FIG. 11. In other words, a dialog box 48 for inputting feedback is displayed. Furthermore, in FIG. 11, the feedback "I like a button for the login," has been input in this dialog box 48. Moreover, as has been described above, a state (run mode) where the "Interactive Storyboard" tab is selected and a state (feedback mode) where the "Feedback" tab is selected are provided, and feedback can only be input with the feedback mode. However, an implementation where these two modes are not provided may also be considered to be an embodiment of the present invention. In such a case, the choice "Login," for example, is provided on the third line of the menu 47. Furthermore, if the first line or the second line is selected, it is possible to input feedback, and if the third line is selected, the operation that is supposed to be carried out when the link 45 is pressed is carried out.

Figure 12:
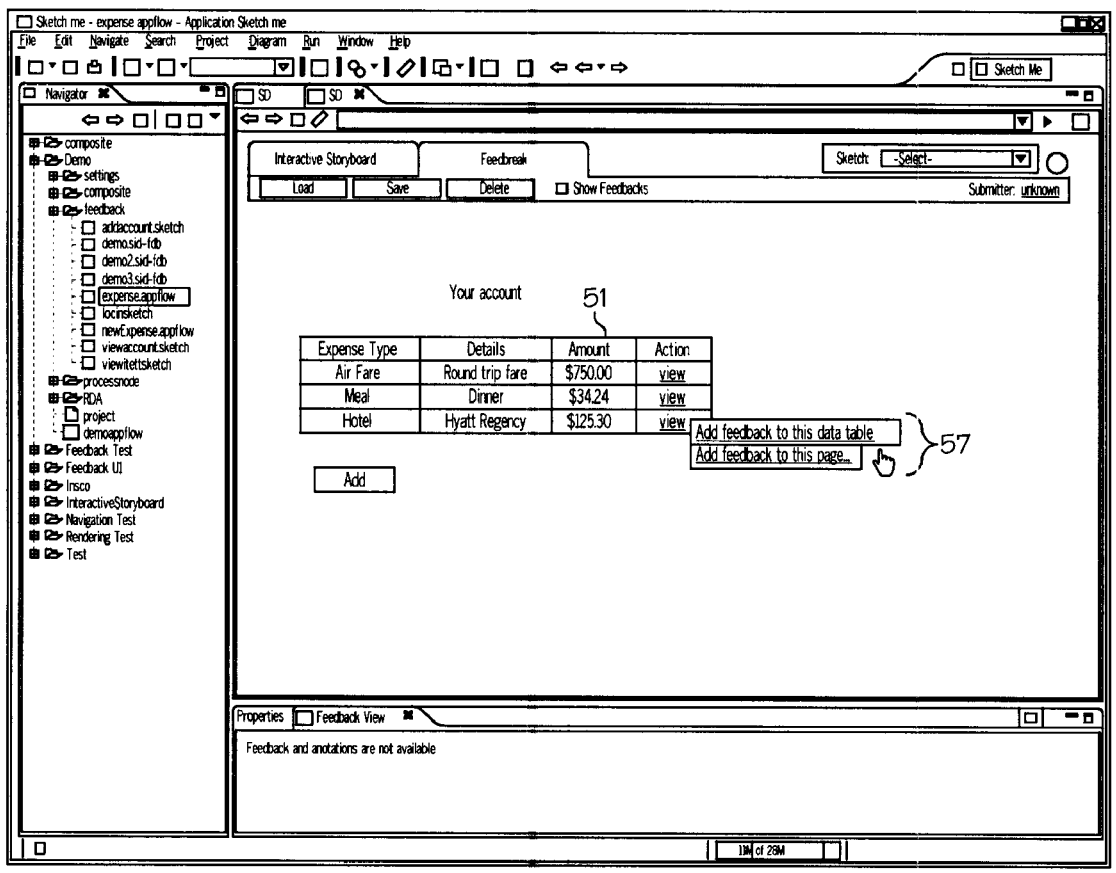
FIG. 12 is a drawing showing an example of a screen that is displayed during the application review in the present embodiment.

FIG. 12 shows the situation when the mouse is clicked on the data table 51 on the table display page 50. In this case, a menu 57 with "Add feedback to this data table" and "Add feedback to this page" is displayed.

Figure 13:
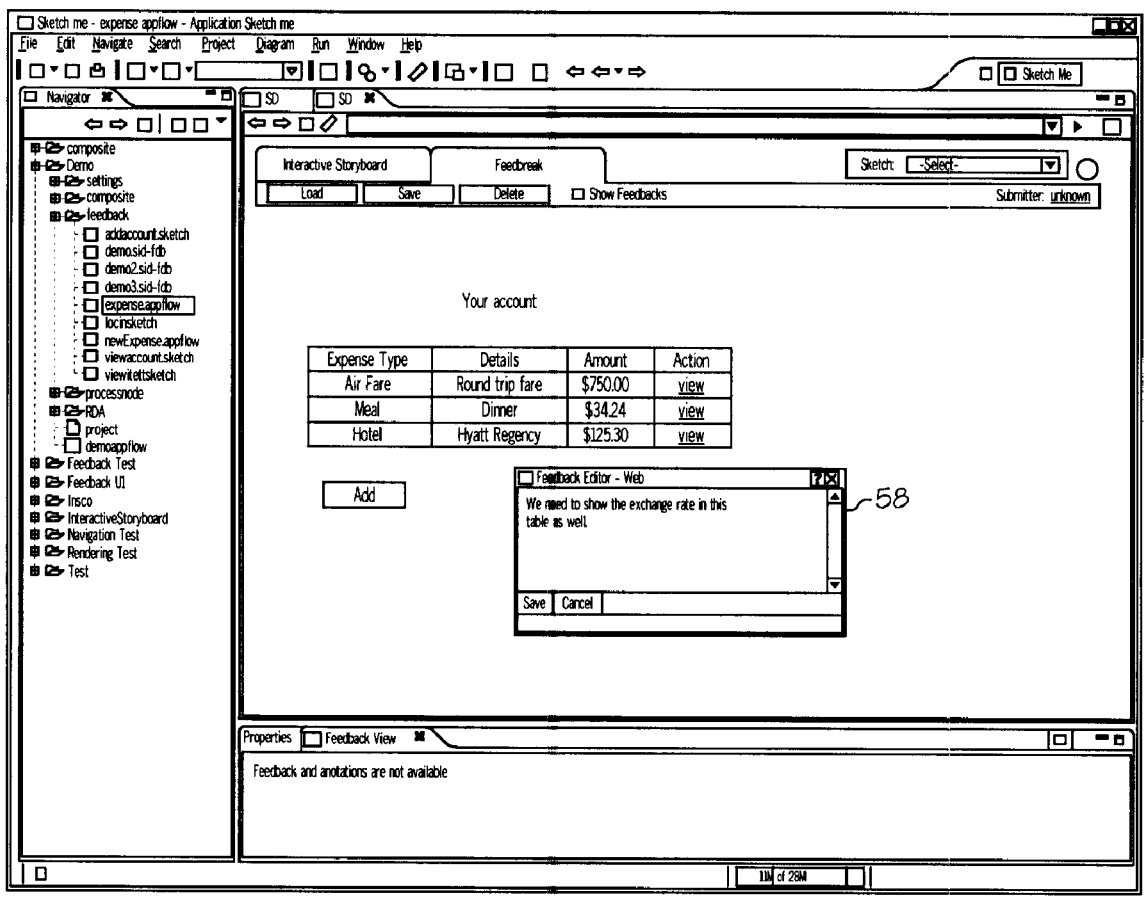
FIG. 13 is a drawing showing an example of a screen that is displayed during the application review in the present embodiment.

In this state, if, for example, the first line on the menu 57 is clicked, it goes to the state shown in FIG. 13. In other words, a dialog box 58 for inputting feedback is displayed. Furthermore, in FIG. 13, the feedback "We need to show the exchange rate in this table as well," has been input in this dialog box 58.

Figure 14:
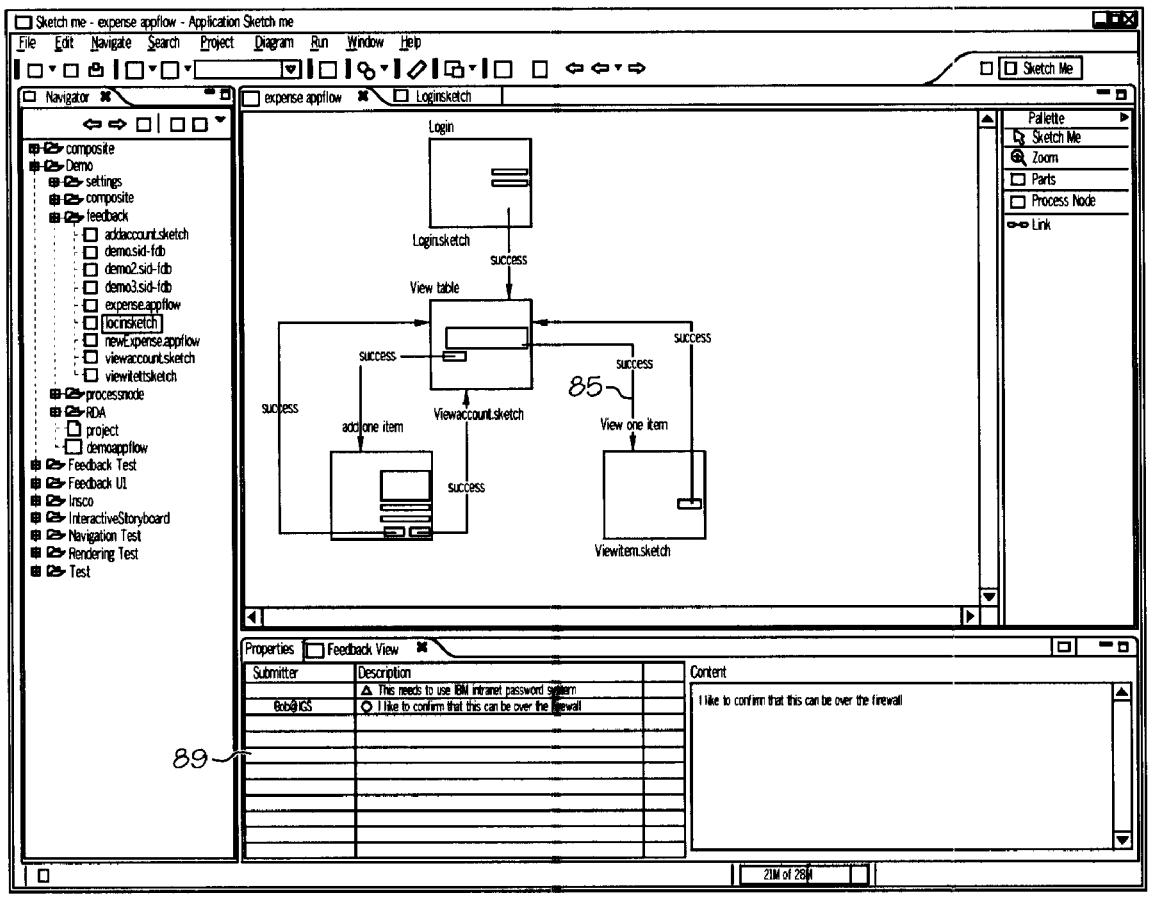
FIG. 14 is a drawing showing an example of a screen that is displayed during the review of the application review results in the present embodiment.
Figure 15:
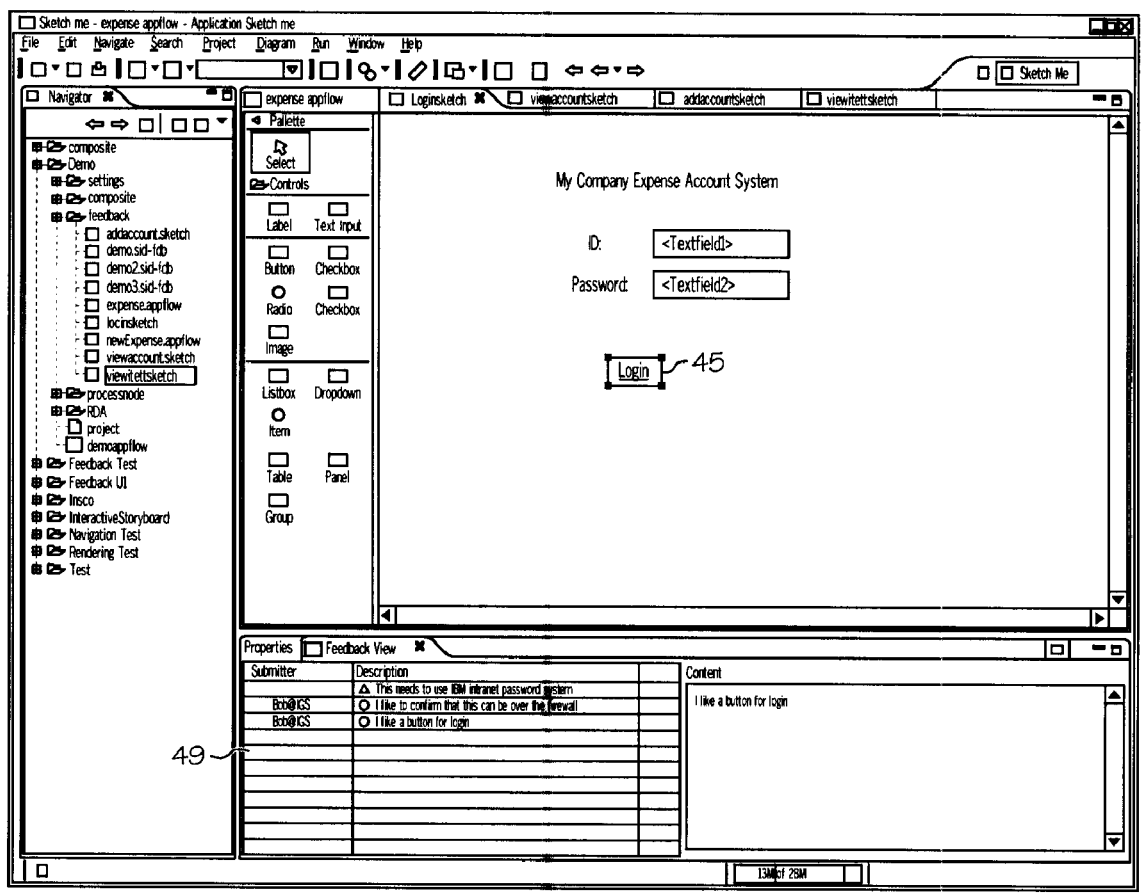
FIG. 15 is a drawing showing an example of a screen that is displayed during the review of the application review results in the present embodiment.

Furthermore, a description of examples of screens displayed on the computer 10 when the developer is checking the feedback will be given referring to FIG. 14 and FIG. 15. FIG. 14 shows the state where the feedback consisting of a plurality of feedback descriptions is displayed in the page flow. In this case, two lines of feedback descriptions are displayed in the feedback view area 89. Furthermore, by selecting the feedback description on the second line, the UI transition 85 corresponding to this is highlighted. FIG. 15 shows the state where feedback is displayed on the login page 40. In this case, three lines of feedback descriptions are displayed in the feedback view area 49. Furthermore, in contrast to FIG. 14, the third line feedback description corresponding to the link 45 is highlighted by selecting the link 45.

Figure 16:
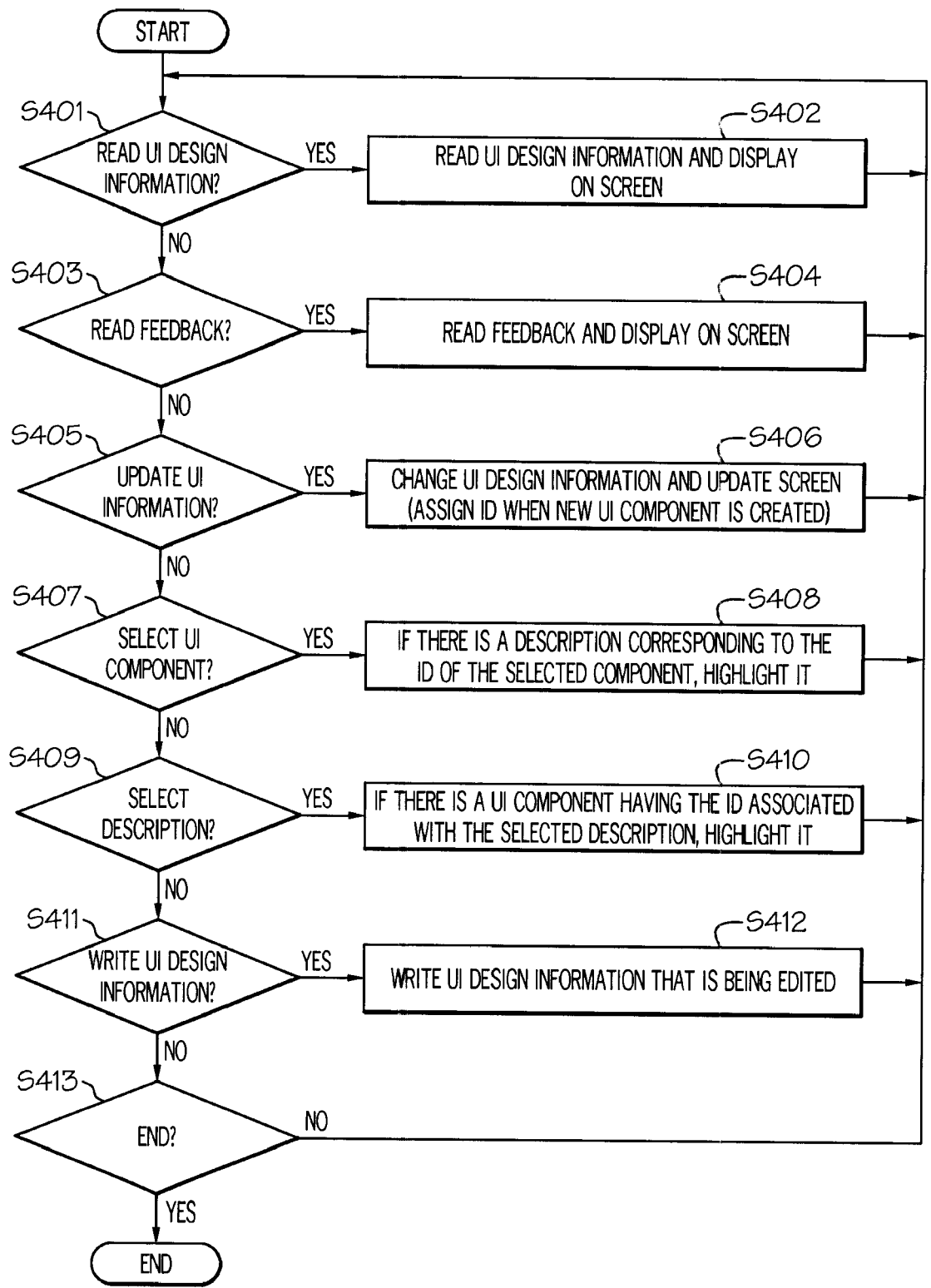
FIG. 16 is a flow chart showing the flow of actions of the design information editing part in the present embodiment.

Next, a detailed description will be given of the application development tool that executes these screen transitions and the operation of the application automatically created by this application development tool. Moreover, in the following also, components (UI components) related to UI objects and UI transitions in the UI are presumed as the objects for which feedback is added. In addition, the UI design information is that which indicates the page flow and page design information in FIG. 3-FIG. 7. FIG. 16 is a flowchart showing the operations of the design information editing part 14, which is a subset of the functions in the application development tool used when the developer edits the design information. Moreover, the design information editing part 14 carries out processing for editing the design information and processing for reading the feedback and bringing it together with the design information. Therefore, the operations related to both will be described together here also.

First, the design information editing part 14 determines whether or not the reading of the UI design information has been indicated (Step 401). Here, if the determination is made that reading of the UI design information is indicated, the UI design information is read and displayed on the screen (Step 402). When reading of the UI design information is not indicated, the design information editing part 14 determines whether or not the reading of feedback has been indicated (Step 403). Here, if the determination is made that reading of feedback is indicated, the feedback is read and displayed on the screen (Step 404).

When reading of feedback is not indicated, the design information editing part 14 determines whether or not the reading of changes to the UI design information has been indicated (Step 405). For example, there is a determination as to whether a new UI component has been added, the position where a UI component is placed has been changed, the color of a UI component has been changed, a UI component has been deleted or the like. Here, if a determination is made that the reading of changes in the UI design information is indicated, the UI design information is changed, and the screen is updated (Step 406). Moreover, when a UI component is added, a unique ID is assigned to that UI component. Furthermore, the correspondence between that UI component and ID are embedded in the UI design information in an understandable format.

When the reading of changes in the UI design information is not indicated, the design information editing part 14 determines whether or not a UI component has been selected (Step 407). Here, if it is determined that a UI component has been selected and if there is a description that has been given correspondence to the same ID as the ID for the selected UI component, that description is highlighted (Step 408). Namely, since the correspondence between the UI component and the ID in Step 406 is embedded in the UI design information, the ID for the selected UI component is first extracted from the UI design information. Furthermore, feedback descriptions that correspond to this ID are identified within the feedback.

When no UI component has been selected, the design information editing part 14 determines whether or not a feedback description has been selected (Step 409). Here, if it is determined that a feedback description has been selected and if there is a UI component having the same ID as the ID that has been given correspondence with the selected description, that UI component is highlighted (Step 410). Namely, as will be discussed later, the feedback description is embedded in the feedback so that the correspondence with the ID of the UI component that is the target of the feedback is understood, so the ID that the selected description corresponds to is extracted from the feedback. Furthermore, the UI component given correspondence with this ID is identified within the UI design information.

When no feedback description has been selected, the design information editing part 14 determines whether or not the writing of the UI design information has been indicated (Step 411). Here, if it is determined that the writing of the UI design information has been indicated, the UI design information that is being edited is written to the design information storage part 11 (Step 412). Subsequently, the design information editing part 14 determines whether or not there has been an end indication (Step 413). Here, when there has been no end indication, there is a return to Step 410, but when there has been an end indication, the process terminates.

Figure 17:
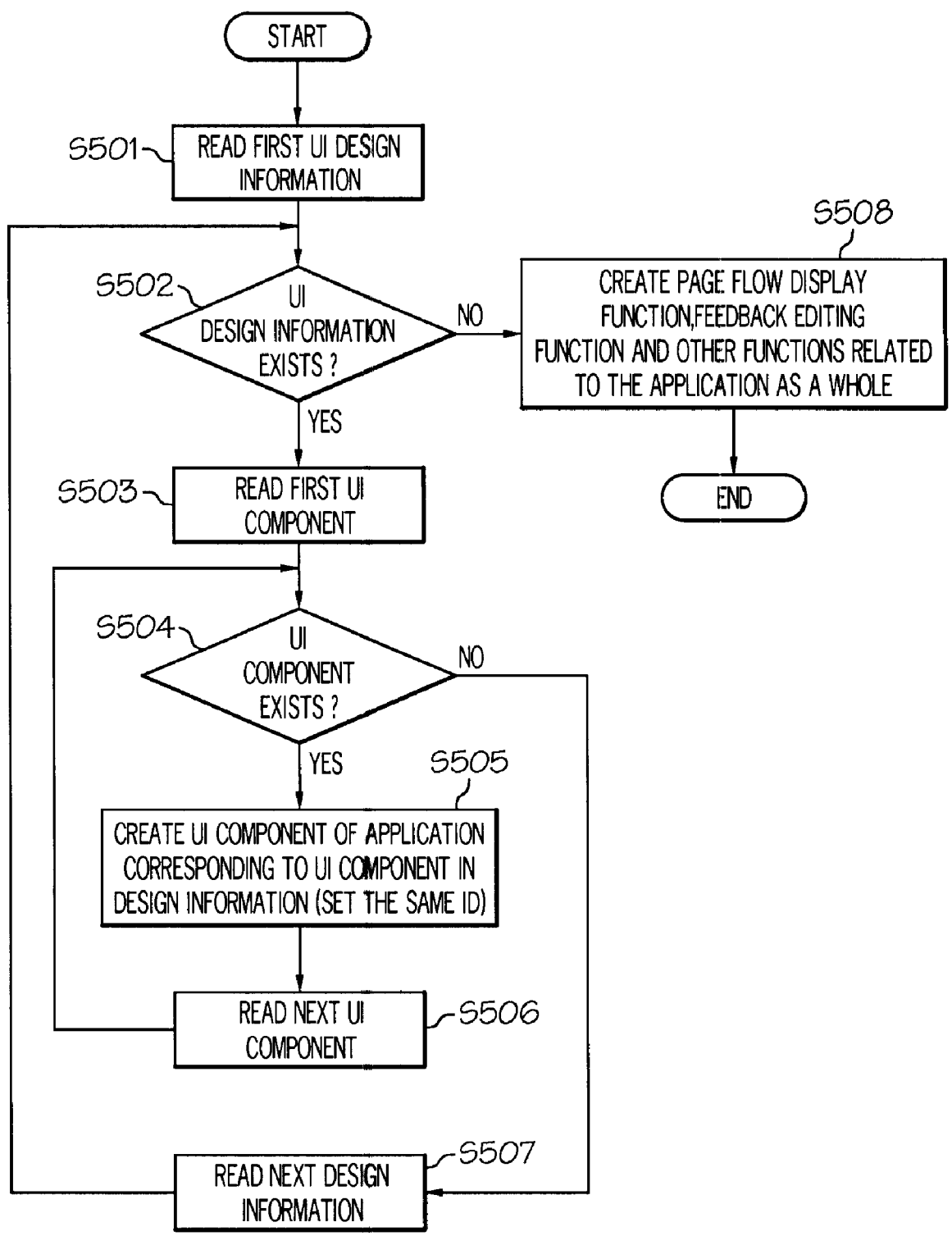
FIG. 17 is a flow chart showing the flow of actions of the application creation part in the present embodiment.

FIG. 17 is a flowchart showing the application creation part 15, which is a function for automatically creating the application based on the design information that has been edited in this manner, out of the application development tool functions. First, the application creation part 15 reads the first UI design information (Step 501). Then it determines whether or not the UI design information has been read (Step 502). Here, when it has been determined that the UI design information has been read, the first UI component included in that UI design information is read (Step 503). Then it determines whether or not the UI component has been read (Step 504). As a result, when it is determined that the UI component has been read, the UI component of the application corresponding to the UI component in the UI design information is created (Step 505). Moreover, the ID assigned in Step 406 to the UI component in the UI design information is set for the UI component in the application at this time.

Subsequently, the application creation part 15 reads the next UI component in the UI design information (Step 506) and returns to Step 504. Then the Steps 504-506 are processed repeatedly until the UI components in the UI design information are exhausted. Furthermore, when the UI components are exhausted, the next UI design information is read (Step 507), and there is a return to Step 502. Then the Steps 502-507 are processed repeatedly until the UI design information is exhausted. Finally, when it is determined that there is no UI design information in Step 502, functions related to the application as a whole, such as a page flow display function or a feedback editing function, are created (Step 508), and processing is terminated.

Figure 18:
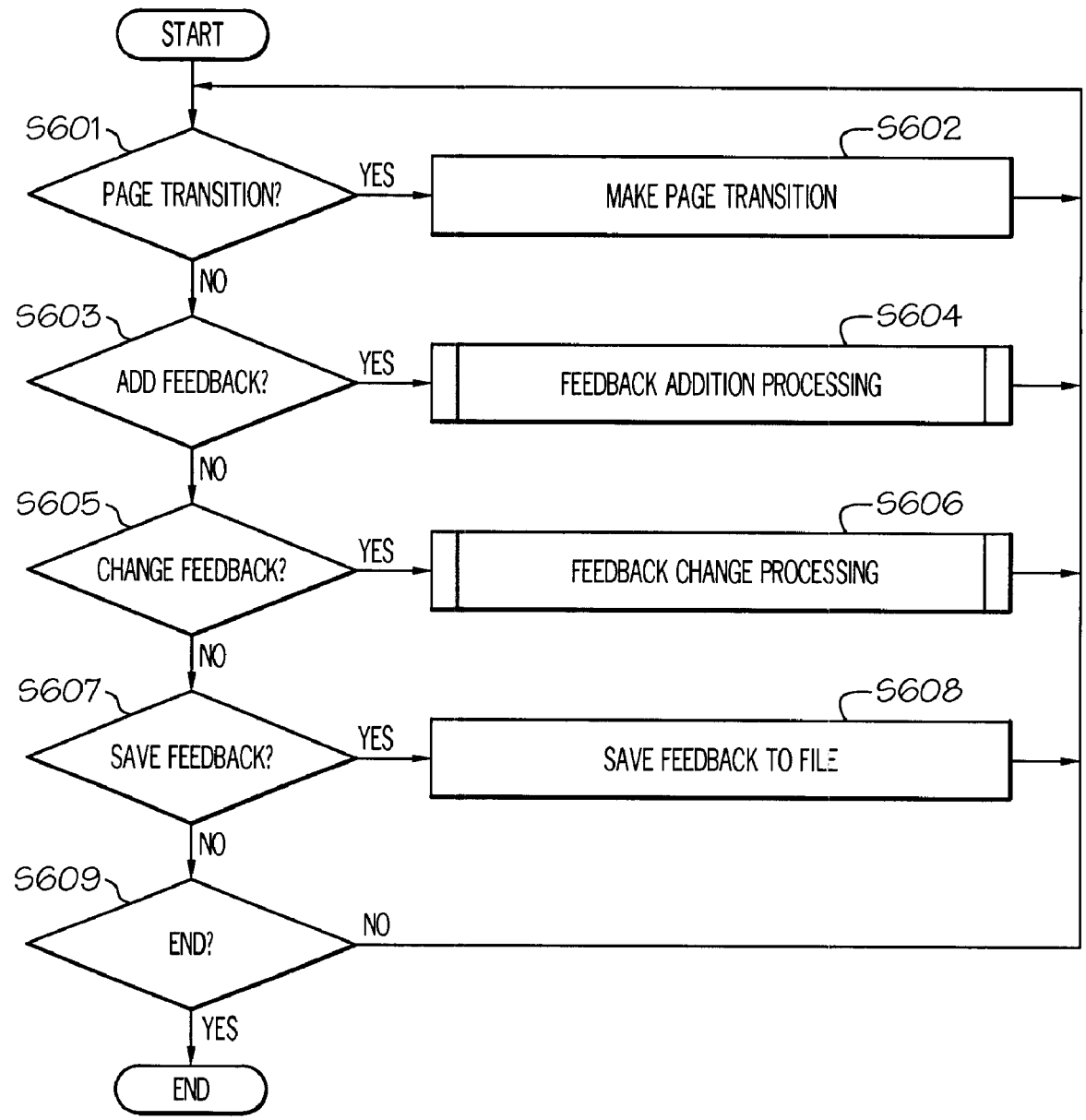
FIG. 18 is a flow chart showing the flow of actions of the feedback editing part in the present embodiment.

FIG. 18 is a flow chart showing the operations for a feedback editing process by the application created by the application creation part 15. First, the application determines whether or not there has been an indication for a page transition (Step 601). Here, when it is determined that there has been an indication for a page transition, the page transition is made (Step 602). When there has been no indication for a page transition, the application determines whether or not there has been an indication for addition of feedback (Step 603). Here, when there is a determination that there has been an indication for addition of feedback, the application carries out feedback addition processing, which will be discussed later (Step 604).

When there has been no indication for the addition of feedback, the application determines whether or not there has been an indication of a change in feedback (Step 605). Here, when there is a determination that there has been an indication of the change, the application carries out feedback change processing, which will be discussed later (Step 606). When there has been no indication of a change in feedback, the application determines whether or not there has been an indication for saving the feedback (Step 607). Here, when there is a determination that there has been an indication for saving the feedback, the application saves the feedback in a file (Step 608). Subsequently, the application determines whether or not there has been an end indication (Step 609). Here, when there has been no end indication, there is a return to Step 601, but when there has been an end indication, the process terminates.

Figure 19A:
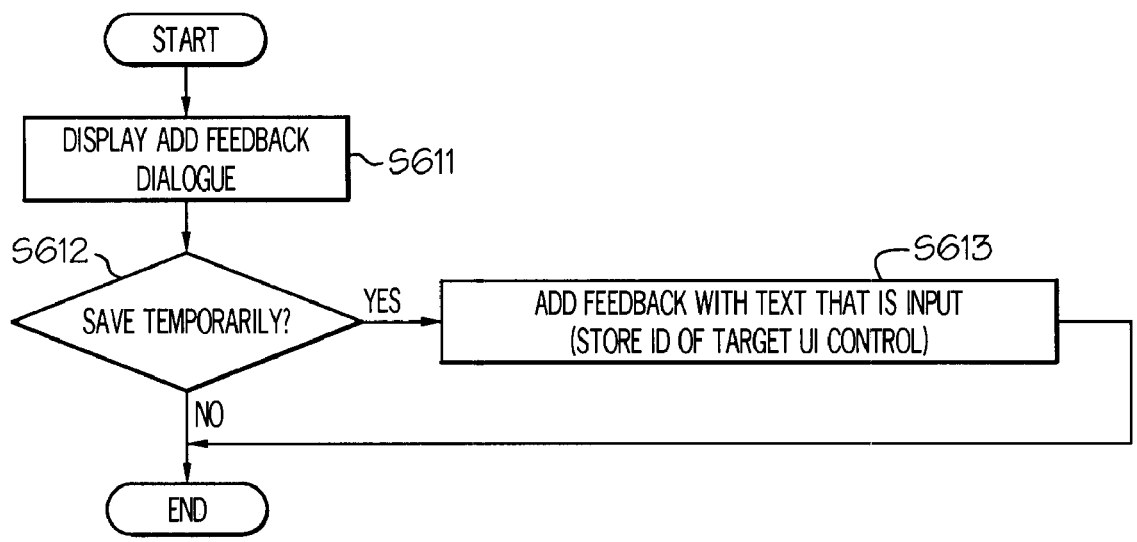
FIG. 19 is a flow chart showing the flow of actions of feedback addition processing and feedback change processing by the feedback editing part in the present embodiment.
Figure 19B:
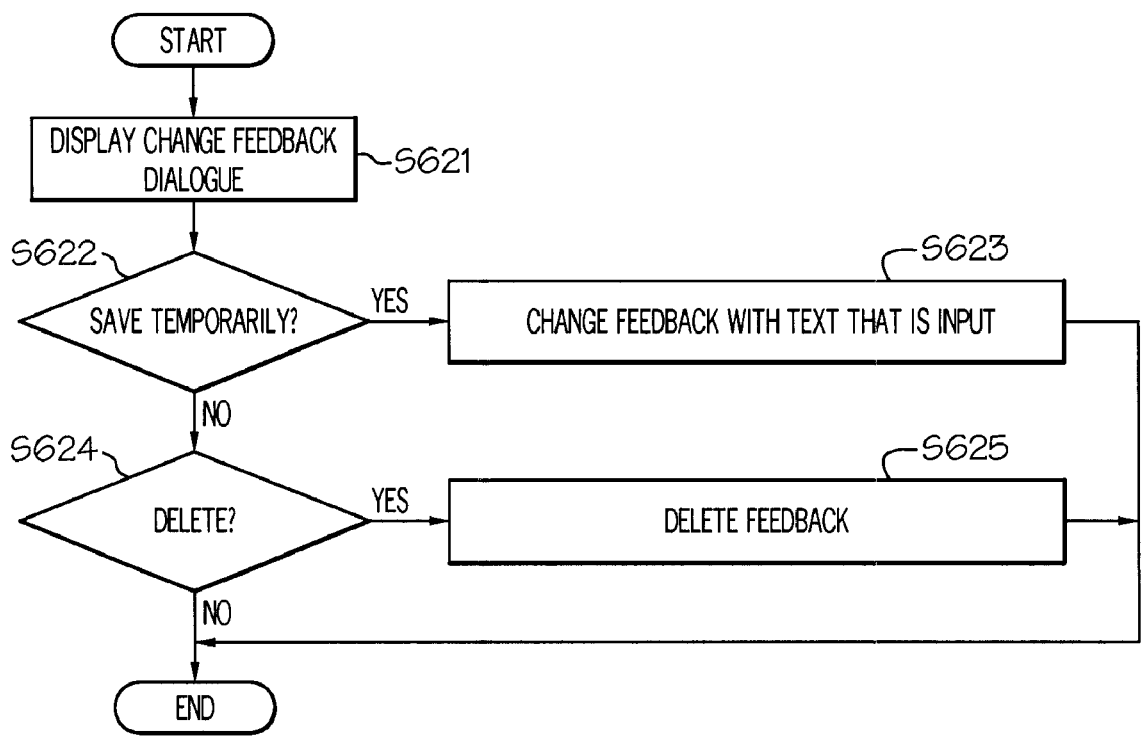

Here, the processing content in Step 604 and Step 606 described above will be described in further detail with reference to FIG. 19. FIG. 19 (*a*) is a flowchart showing the detailed operations of the feedback addition process in Step 604. When the feedback addition process starts, the application first displays a dialog box (Add Feedback dialog) for adding feedback (Step 611). In addition, if the user inputs feedback in to this dialog box, that input is received. Furthermore, whether or not there has been an indication for temporarily saving the feedback that has been input is determined (Step 612).

As a result, when it is determined that there has been such a save indication, the application stores the feedback that has been input in memory that it can reference itself (Step 613). Moreover, the application determines which UI component the indication of the feedback addition was for in Step 603 based on the position information on the screen and obtains the ID for that UI component based on the correspondence between the UI component and the ID embedded in the application. Furthermore, in this Step 613, the feedback that has been input is related to and maintained with the correspondence with the ID for that UI component. On the other hand, when there is no indication for that saving, the processing ends.

FIG. 19 (*b*) is a flowchart showing the detailed operations of the feedback change process in Step 606. When the feedback change process starts, the application first displays a dialog box (Change Feedback dialog) for changing the feedback (Step 621). Moreover, the application determines which UI component the indication of the feedback change was for in Step 605 based on the position information on the screen and obtains the ID for that UI component based on the correspondence between the UI component and the ID embedded in the application. Furthermore, feedback that is related to that UI component and already saved in the memory that it can reference is read and displayed in the Change Feedback dialog. In addition, if the user adds changes to that feedback, those changes are received. Furthermore, whether or not there has been an indication for temporarily saving the feedback after the changes is determined (Step 622).

As a result, when it is determined that there has been such a save indication, the application changes the feedback in the memory using the feedback that has been entered (Step 623).

In addition, when there has been no indication for that saving, the application determines whether or not there has been an indication for deleting the feedback (Step 624). As a result, when it is determined that there has been such an indication for deletion the application deletes the feedback in the memory (Step 625). On the other hand, when there is no indication for that deletion, the processing ends.

In the present embodiment, the ID for the UI component is embedded in all of the design information created by the design information editing part 14, the application created by the application creation part 15, and the feedback created by the feedback editing part 26. Therefore, specific examples of the methods for embedding the ID for the UI component will be described with reference to examples of source code that correspond to the design information, the application and the feedback, respectively. FIG. 20 shows examples of source code used in the design and creation of an application. Of these, FIG. 20 (*a*) shows the part corresponding to the link 45 placed on the login page in the source code forming the basis for the application design screen. The ID assigned to the link 45 is embedded in the place in this source code that is surrounded by the rectangle. Of these, FIG. 20 (*b*) shows the part corresponding to the link 45 placed on the login page in the source code of the automatically created application. The ID assigned to the link 45 is embedded in the place in this source code that is surrounded by the rectangle.

Furthermore, FIG. 21 shows the source code of a file where the feedback is output when feedback is added for the link 45 on this login page 40. The ID assigned to the link 45 is also embedded in the place in this source code that is surrounded by the rectangle. In addition, the feedback description "This needs to be a button" is written two lines below that. In other words, this file may be considered as correspondence information in which the ID for the component that is the target of the feedback is associated with the feedback description.

Figure 22:
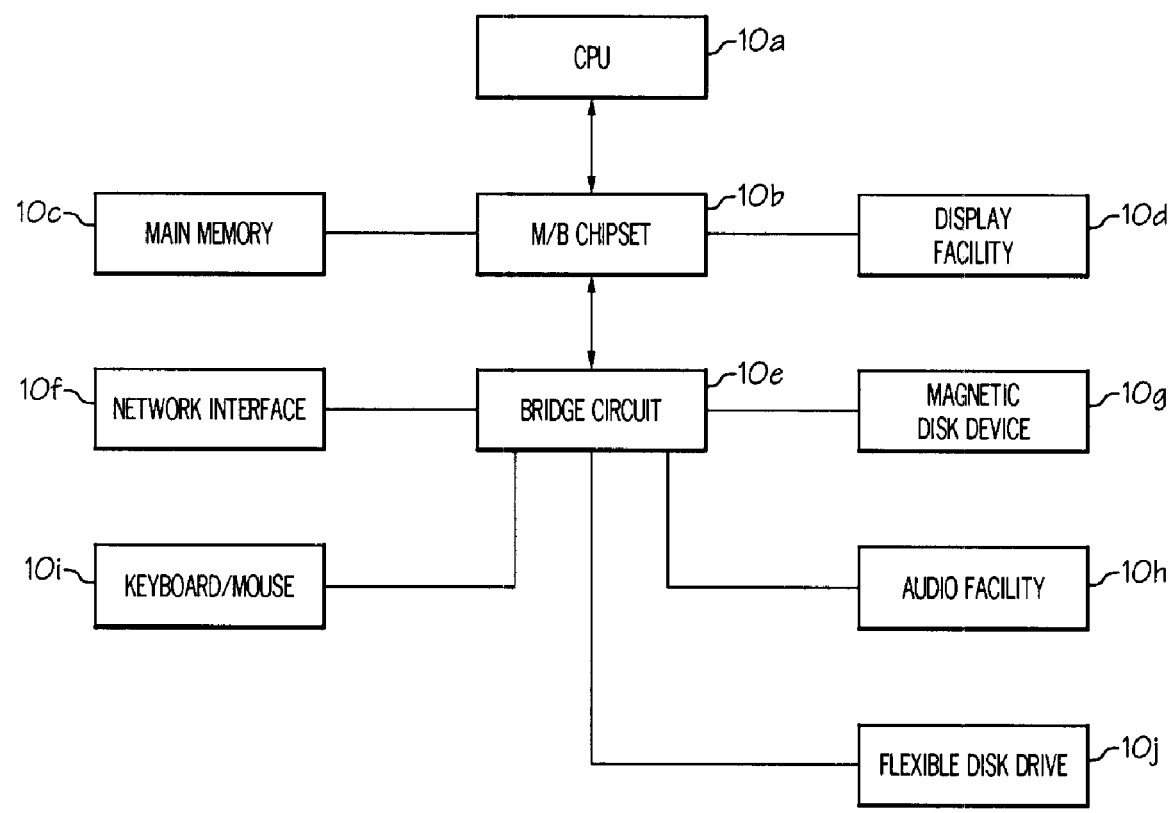
FIG. 22 is a drawing showing a computer hardware configuration that may be used in the present embodiment.

Finally, the computer hardware configuration preferable for use as computer 10 and computer 20 in the present embodiment will be described. FIG. 22 is a drawing showing an example of this computer hardware configuration. As is shown in the figure, the computer is equipped with a central processing unit (CPU) 10*a*, which is a computation means, a main memory 10*c* connected to the CPU 10*a* via a motherboard (M/B) chipset 10*b*, and a display facility 10*d* connected to the CPU 10*a* by the same M/B chipset 10*b*. In addition, a network interface 10*f*, a magnetic disk drive device (HDD) 109, an audio facility 10*h*, a keyboard/mouse 10*i* and a flexible disk drive 10*j* are connected to the M/B chipset via a bridge circuit 10*e*.

Moreover, each of the constituent elements is connected via a bus in FIG. 22. For example, a connection is made between the CPU 10*a* and M/B chipset 10*b* and between the M/B chipset 10*b* and the main memory 10*c* via a CPU bus. In addition, a connection may be made between the M/B chipset 10*b* and the display facility 10*d* via an accelerated graphics port (AGP), but when the display facility 10*d* includes a PCI express compatible video card, the connection between the M/B chipset 10*b* and this video card is made via a PCI express (PCIe) bus. In addition, when connected with the bridge circuit 10*e*, the network interface 10*f* may, for example, use PCI express. In addition, the magnetic disk device 10*g* may use, for example, serial AT attachment (ATA), parallel ATA or peripheral component interconnect (PCI). Furthermore, the keyboard/mouse 10*i* and the flexible disk drive 10*j* may use a universal serial bus (USB).

Here, the present invention may be implemented totally through hardware, or may be implemented totally through software. In addition, it may be implemented through both hardware and software. In addition, the present invention may be implemented as a computer, data processing system or computer program. This computer program may be stored on a computer-readable medium. Here, electronic, magnetic, optical, electromagnetic, infrared, semiconductor system (device or machine), or propagation media may be considered for the medium. In addition, semiconductor or solid-state recording devices, magnetic tape, removable computer diskettes, random access memory (RAM), read only memory (ROM), rigid magnetic disks, and optical discs may be cited as examples for the computer-readable medium. At present, the example of optical discs includes compact disc read only memory (CD-ROM), compact disc read/write (CD-R/N) and DVD.

What is claimed:

1. A device for managing reviewer feedback for the development of application programs, comprising:
   a reviewer display part
      for displaying a plurality of user interface elements, the elements defining operations of an application program and operational flow of said plurality of application user interface elements of said application program; and
   a processor creation part
      for creating said application program consistent with preexisting instructions, where user interface operations of the application program are portrayed by said plurality of user interface elements,
      for carrying out operations of said application program, and
      for maintaining feedback information for a specific application user interface element and data from a reviewer, said data input by said reviewer for said specific application user interface element,
         wherein feedback information for said specific application user interface element is maintained using an identifier.

2. The device according to claim 1 wherein the processor is further configured to output said feedback information, comprising graphic user interface data, as a file.

3. The device according to claim 1, further comprising:
   a reading part for storing said feedback information that said application program maintains, wherein said reviewer display part further displays said data including said feedback information read by said reading part.

4. The device according to claim 3 wherein said reviewer display part is further configured to display, according to a predetermined operation, the feedback relationship between said specific element out of said plurality of elements and said data.

5. The device according to claim 1 wherein said specific element out of said plurality of elements is a user interface object for inputting information from and outputting information to users.

6. The device according to claim 1 wherein said specific user interface element out of said plurality of elements is a transition between two user interface objects for inputting information from and outputting information to users.

7. The device according to claim 1 wherein said plurality of elements that define user interface operations of an application includes a graphical interface that comprises one or more of a button, a text box, a table or a checkbox.

8. The device according to claim 1 wherein the data from said reviewer is provided after prompting said reviewer for edits to a hyperlink or for authenticating a server.

9. The device of according to claim 1 wherein specific application user elements displayed to said reviewer are identified by position and said identifier.

10. A method for managing reviewer feedback for an application program, comprising the steps of:
- displaying, to a reviewer, a plurality of elements that graphically defines operational flow of said an application program,
- describing said application program, said application program carrying out operations defined by said plurality of elements, said application program maintaining feedback relationship information between a specific element and data from a reviewer when said data is input from a reviewer for said specific element out of said plurality of elements, wherein said feedback relationship information is maintained using an identifier,
- identifying and storing said feedback relationship information that said application program maintains, and
- displaying said data from the reviewer, including said feedback relationship information, to a developer.

11. The method according to claim 10, further comprising a step of:
- assigning an identifier to said specific element,
  - wherein in said describing step,
    - said identifier is maintained,
    - said identifier is obtained when data about said specific element is received from said reviewer, and
    - said application program is created; and maintaining said feedback information relating said identifier and said data.

12. The method according to claim 10, further comprising a step of:
- displaying in a page flow view the correspondence relationship between said specific element and said data.

13. The method according to claim 12, further comprising the steps of:
- assigning an identifier to said specific element; and
- relating and storing said specific element and said identifier,
  - wherein in said describing step,
    - said identifier is maintained and said identifier is obtained when data about said specific element is input, and
    - said application program is described using information relating said identifier and said data, and
  - in said step of displaying said correspondence relationship, said feedback relationship between said specific element that has been saved related to said identifier included in said feedback information and said data is displayed.

14. The method according to claim 10 wherein said feedback relationship information includes concurrently displaying a user interface object and feedback from said reviewer.

15. The method of claim 10 further comprising:
- analyzing a user interface transition after receiving feedback from said reviewer.

16. The method of claim 10 wherein displaying a plurality of elements that define operational flow of an application program to said reviewer comprises:
- rendering a page flow display of said application.

17. A computer program stored in a storage medium for managing reviewer feedback, said computer program causing a computer to implement:
- a function for reading design information obtained from a reviewer by displaying operations of an application program using a plurality of graphic user interface elements, the plurality of graphic user interface elements displayed to a reviewer prior to reading the obtained design information; and
- a function for reviewing said application program based on said obtained design information,
  - said application program carrying out the operations defined by said plurality of elements and,
  - maintaining feedback information between a specific user interface element and data when said data is input by said reviewer for said specific user interface element out of said plurality of elements,
  - wherein feedback information between a specific user interface element and data input by a reviewer is maintained using an identifier.

18. The computer program according to claim 17 wherein said function for reviewing reviews said application program and outputting said feedback information as a file.

* * * * *